United States Patent [19]

Beining et al.

[11] Patent Number: 4,695,827
[45] Date of Patent: Sep. 22, 1987

[54] ELECTROMAGNETIC ENERGY INTERFERENCE SEAL FOR LIGHT BEAM TOUCH PANELS

[75] Inventors: August H. Beining, Fullerton; Larry A. Dial, Diamond Bar; William A. Smith; Gene W. Rieck, both of Laguna Hills, all of Calif.

[73] Assignee: Hughes Aircraft Company, Los Angeles, Calif.

[21] Appl. No.: 673,311

[22] Filed: Nov. 20, 1984

[51] Int. Cl.$^4$ ............................................. G08C 21/00
[52] U.S. Cl. ................................. 340/365 P; 340/712; 250/221
[58] Field of Search ............... 340/365 P, 365 R, 711, 340/712; 250/221, 222.1, 214 C; 178/18, 19, 20; 350/96.27, 96.30, 319, 322; 358/252, 253, 247, 245; 174/35 R, 35 MS; 313/313, 402, 408; 219/10.55 D

[56] References Cited

U.S. PATENT DOCUMENTS

| | | | |
|---|---|---|---|
| 2,636,125 | 4/1953 | Southworth . | |
| 3,673,327 | 6/1972 | Johnson et al. | 178/18 |
| 3,764,813 | 10/1973 | Clement et al. | 250/221 R |
| 3,775,560 | 11/1973 | Ebeling et al. | 178/18 |
| 3,860,754 | 1/1975 | Johnson et al. | 178/18 |
| 3,907,403 | 9/1975 | Maeda | 350/96.27 |
| 3,924,239 | 12/1975 | Fletcher et al. | 343/909 |
| 4,198,623 | 4/1980 | Misek et al. | 340/365 P |
| 4,243,879 | 1/1981 | Carroll et al. | 250/221 |
| 4,247,737 | 1/1981 | Johnson | 174/35 |
| 4,357,771 | 11/1982 | Olds | 350/319 |
| 4,381,421 | 4/1983 | Coats et al. | 174/35 |
| 4,384,201 | 5/1983 | Carroll et al. | 250/221 |
| 4,402,574 | 9/1983 | McConnel | 350/319 |
| 4,417,824 | 11/1983 | Paterson et al. | 340/365 P |
| 4,459,476 | 7/1984 | Weissmueller et al. | 250/221 |
| 4,484,179 | 11/1984 | Kasday | 340/365 P |
| 4,517,559 | 5/1985 | Deitch et al. | 250/221 |
| 4,591,710 | 5/1986 | Komadina et al. | 250/214 C |

FOREIGN PATENT DOCUMENTS

| | | |
|---|---|---|
| 0059063 | 9/1982 | European Pat. Off. . |
| 0113218 | 7/1984 | European Pat. Off. . |
| 0067277 | 5/1980 | Japan ............................. 358/252 |
| 2042854 | 9/1980 | United Kingdom . |

OTHER PUBLICATIONS

U.S. patent application, Ser. No. 06/673,306 entitled Integrated Touch Panel System for Display, A. H. Beining, filed Nov. 20, 1984.

International Search Report for International Application Nos. PCT/US85/02182 and PCT/US85/02183.

Wescon Technical Paper—"Designing Business Machine Cabinets for Optimal EMI Shielding", vol. 26, Sep. 1982.

*Primary Examiner*—John W. Caldwell, Sr.
*Assistant Examiner*—Mahmoud Fatahi-yar
*Attorney, Agent, or Firm*—Thomas A. Runk; Anthony W. Karambelas

[57] ABSTRACT

An electromagnetic energy interference seal arrangement is provided for use in light beam touch panel systems. The electromagnetic energy interference seal includes the use of waveguides associated with the light beam sources and detectors to improve light beam touch panel performance. The waveguide size is selected so that it operates as a waveguide above cutoff frequency for the light beams but operates as a waveguide below cutoff frequency for blocking electromagnetic energy interference. The waveguides improve the light beam signal to noise ratio since they shade the detectors from reflections and from extraneous light such as from overhead room lighting. Bonding of part of the electromagnetic energy interference seal is effected by an electrically conductive compound which enables nondestructive disassembly when required. Environmental sealing strips are provided to cover the waveguide apertures to protect against dust, liquids and other environmental contaminants.

30 Claims, 5 Drawing Figures

ELECTROMAGNETIC ENERGY INTERFERENCE SEAL FOR LIGHT BEAM TOUCH PANELS

BACKGROUND OF THE INVENTION

The invention relates generally to touch panel display systems, and more particularly, to sealing light beam touch panel display systems against electromagnetic energy interference.

Patents disclosing such touch panel display systems include U.S. Pat. No. 3,764,813 to Clement et al., granted Oct. 9, 1973; U.S. Pat. No. 3,775,560 to Ebeling et al., granted Nov. 27, 1973; and U.S. Pat. No. 4,198,623 to Misek et al., granted Apr. 15, 1980. In systems such as these where light beam sources direct beams of light across the face of a display toward light beam detectors located on the other side of the display, electromagnetic energy may escape from the display unit and allow its detection and it may also interfere with sensitive electronic equipment in the immediate area. Also, external electromagnetic energy may enter the display unit and interfere with its operation. Prior electromagnetic energy shielding arrangements for touch panel display units have been complex, bulky, and have not been sufficiently integrated with the display unit. These prior arrangements have, in some cases, made maintenance of the display unit more difficult and have typically not been of the type which also enhance display operations.

Various internal touch panel circuits as well as various display circuits generate signals which may radiate from the display unit. Where square wave signals are used inside the display unit, harmonics of relatively high frequency may escape. Where the touch panel display unit is to be used in an environment requiring the control of compromising emanations, suppressing the radiation of such signals may be required in order to avoid detection. In the case where the display unit is located near other equipment which radiates electromagnetic energy, such as a radar system, exposure of the display unit circuits to that energy may cause faults, processing errors or have other detrimental effects on display unit operation. As used herein, electromagnetic energy interference refers to signals which are of lower frequency than that of the touch panel light beams.

Prior touch panel light beam systems are also susceptible to extraneous light striking the light beam detectors. Such light lowers the signal to noise ratio of the light beam system and, if intense enough, may disable the system since the detector will be biased by the extraneous light and will not sense an interruption in the light beam. An effect such as this occurs in some prior light beam systems near the edge or border of the display. In that area, the light beam may be reflected by the raised border of the display and strike the detector at an angle acute to the straight line between the light beam source and dectector. If the reflection is strong enough, the detector will be biased by such reflection and will not sense an interruption of the main beam in certain places. A prior technique for defeating this border reflection is installing a protruding opaque object or "reflection fence" at the border to disrupt reflections. However, this technique does not solve the problem of lowered signal to noise ratio due to extraneous light.

Accordingly, it is an object of the invention to provide an electromagnetic energy interference seal which impedes the propagation of electromagnetic energy interference into and out of a touch panel display unit.

It is also an object of the invention to provide an electromagnetic energy interference sealing arrangement for use in a touch panel display system which reduces the amount of extraneous and ambient light reaching the light beam detectors thereby resulting in an improved signal to noise ratio in the touch panel area.

It is also an object of the invention to provide an electromagnetic energy interference sealing arrangement for use in a touch panel display system having improved efficiency and improved reliability over prior touch panel display system seal arrangements.

SUMMARY OF THE INVENTION

The foregoing objects and other objects are attained wherein there is provided an electrically conductive electromagnetic energy interference seal which borders the display and seals the display unit against electromagnetic energy interference while improving the signal to noise ratio of the light beam system. More particularly, an electromagnetic energy interference seal arrangement is provided which comprises an electrically conductive seal for placement around the periphery of the display touch panel active area, and in which waveguides have been formed to provide for the transmission of and to guide the light beams. These waveguides are electrically conductive and have a particular aspect ratio of length to cross-section so that they function as waveguides above cutoff for transmitting the light beams but operate below cutoff for electromagnetic energy interference, thus filtering out that interference. In addition to preventing the propagation of electromagnetic energy interference into or out of the display unit, these waveguides collimate the light beams used in the touch panel system and improve the signal to noise ratio by shading against extraneous light.

In the case where an electrically conductive display outer enclosure surrounds the sides, top, bottom, and back of the display unit, and an electrically conductive front bezel is used, the electromagnetic energy interference seal arrangement of the invention may be positioned between the front bezel and the display screen to provide electromagnetic energy interference shielding between the two. Where a display faceplate is used, it may also be made electrically conductive such as by means of forming it of an electrically conductive material, using an embedded wire mesh or by applying a conductive coating to enhance electromagnetic energy interference sealing of the display system. The electrically conductive faceplate would be placed in electrical contact with the seal arrangement to form a completely electrically conductive housing.

For environmentally sealing the light beam waveguides against dust, dirt, liquids and other contaminants, a strip of material which is transparent to the light beams is mounted over the external and internal openings of the waveguides.

For mounting the electromagnetic energy interference seal in accordance with the invention to the electrically conductive faceplate, an electrically conductive adhesive compound is used which permits nondestructive disassembly. This technique preserves the electromagnetic energy interference seal when assembled and facilitates disassembly and maintenance of the display system.

DETAILED DESCRIPTION OF THE INVENTION

Figure 1:
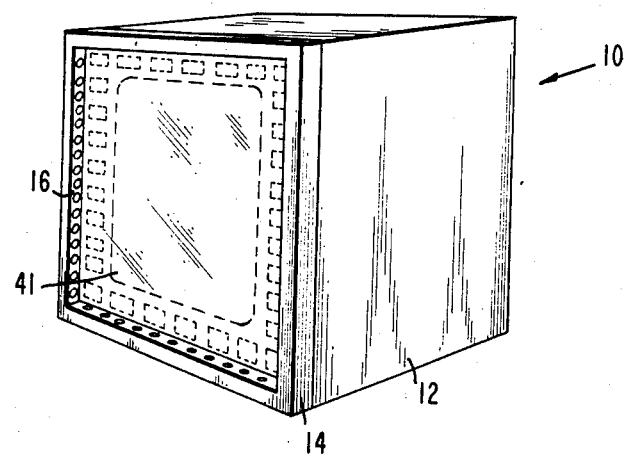
FIG. 1 is a diagrammatic view of a light beam touch panel display unit showing the touch sensitive active area, light beam apertures, fixed function key areas and the outer display unit enclosure.
Figure 2:
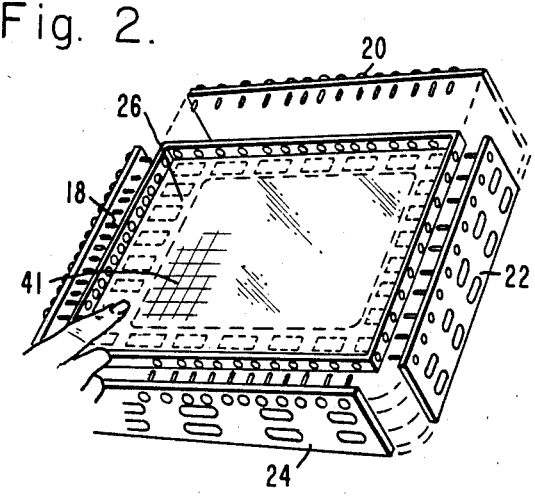
FIG. 2 is a perspective, diagrammatical view of the light beam touch panel system of FIG. 1 showing the touch sensitive active area and surrounding circuit boards.

Where appropriate, like reference numerals have been used in the various drawings to designate like elements. Referring with more particularity to the drawings, FIG. 1 shows an electronic, touch panel display unit 10 including an outer enclosure 12 for the back, top, bottom, and sides of the display unit 10, a front bezel 14, and a light beam touch panel 16. FIG. 2 shows circuit boards 18, 20, 22 and 24 mounted peripherally around a display faceplate 26. On these circuit boards 18, 20, 22 and 24 are mounted light beam sources and light beam detectors such as light emitting diodes (LEDs) and photo transistors which provide a matrix of crossed light beams. These circuit boards 18, 20, 22 and 24 also carry electronic circuitry associated with the light beam matrix which extends both horizontally and vertically across the faceplate 26.

As used herein, light beam matrix refers to an arrangement where the light beam transmitted between a light beam source which is paired with a light beam detector is substantially in the same plane as the light beam transmitted between another paired light beam source and detector so that their respective beams may physically intersect; or where two or more sets of paired light beam sources and detectors are in different planes so that their respective beams may cross but not physically intersect.

Figure 3:
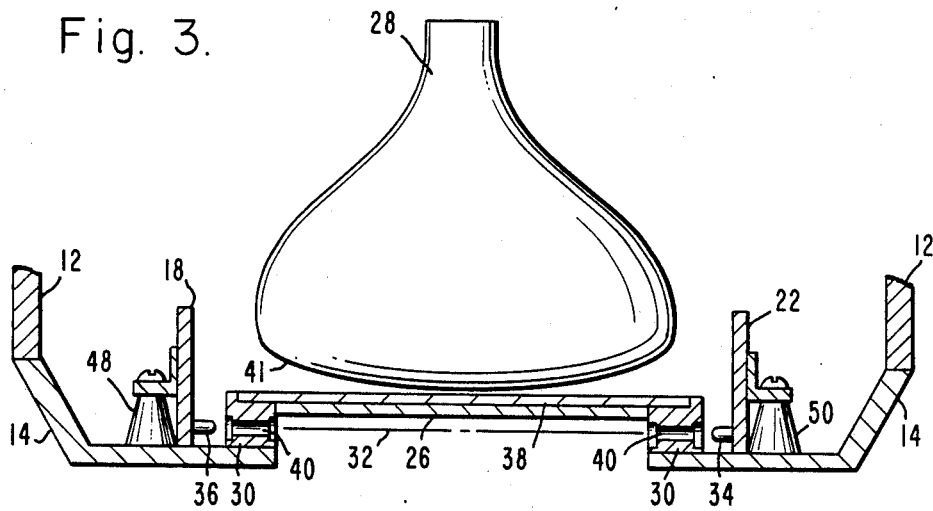
FIG. 3 is a partial cross sectional view showing an arrangement for electromagnetic energy interference sealing between the faceplate and the front bezel of a touch panel display unit.

FIG. 3 shows an arrangement for an electromagnetic energy interference sealing of a touch panel display system in accordance with the invention. A cathode ray tube (CRT) 28 is used as the display device in this figure. An outer, electrically conductive display enclosure 12 is attached to an electrically conductive bezel 14 which has an electromagnetic energy interference seal 30 in accordance with the invention between it and the faceplate 26. The bezel 14 shape can be angled (as shown), square, or have other shapes as desired. The bezel 14 may be attached to the electromagnetic energy interference seal 30 by means such as screws (not shown). The path of a light beam 32 located in front of and very close to the faceplate 26 is indicated by dashed lines. As shown in FIG. 3, the light beam 32 is generated by a light beam source 34 located on one side of the faceplate 26 and is detected by a light beam detector 36 located on the opposite end of the faceplate 26. An interruption in the light beam 32 by an object such as a finger being placed in the path of the beam will be detected by the detector 36. Light beam source and detector pairs such as the pair shown in FIG. 3, are located on the peripherally mounted circuit cards, such as those shown in FIG. 2 (18, 20, 22 and 24). The pair shown in FIG. 3 partially comprises the light beam matrix shown figuratively in FIG. 2.

Figure 4:
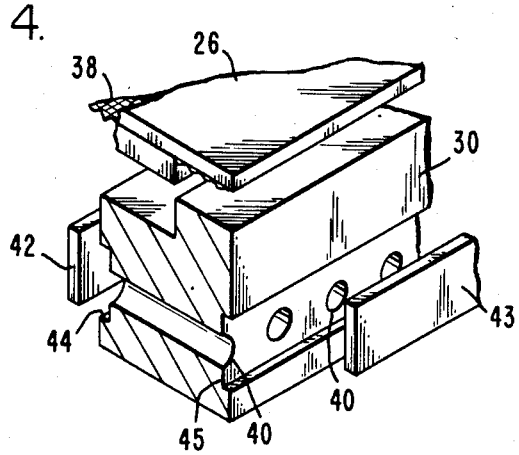
FIG. 4 is a partial cross sectional view which shows an electromagnetic energy interference seal in accordance with the invention.

FIG. 3 also shows the electromagnetic energy interference seal 30 connected to a conductive wire mesh 38 embedded in the display faceplate 26. This feature is also shown in FIG. 4. The faceplate 26 is formed of an optically transparent material such as glass or plastic. When made of glass, the faceplate 26 will normally be approximately one-eighth inch thick. It may also be made of transparent plastic material, such as polycarbonate, sold under the trademark "Lexan" by General Electric Company of Pittsfield, Massachusetts. If plastic is employed, the faceplate would normally be somewhat thicker than glass, e.g., on the order of one-fourth inch thick.

The embedded wire mesh 38 is constructed of an electrically conductive material so that it will provide electromagnetic energy interference sealing, and it may be black to reduce interference with viewing the display screen which in FIG. 3, is a cathode ray tube (CRT) 28. The wires of the embedded wire mesh 38 should be relatively fine, so as to avoid undue interference with viewing the display. Although other materials and sizes may be used, a mesh with 145 by 145 strands per inch of wires having a diameter of approximately 0.051 mm (two mils) and formed of stainless steel wire with silver plating oxidized so that it turns black, has been successfully employed. Also, a blackened copper mesh is usable. The use of blackened wires embedded in clear glass results in a faceplate which is also a neutral density filter and which does not undesirably alter the colors of a color display. It should be understood that the wire spacing and wire diameter may be varied consistent with maintaining mesh openings sufficiently small enough to block electro-magnetic energy interference but to maintain a relatively high ratio of viewing area to area which is blocked by the wires so that viewing of the display is not significantly obstructed.

The faceplate 26 may be provided with a very thin electrically conductive film or coating to provide a supplemental electromagnetic energy interference seal to the embedded wire mesh 38 or it may be used without the embedded wire mesh 38. Usable electrically conductive films or coatings include a gold flash, very thin, so that it is nearly transparent, or indium tin oxide which has a high degree of optical transparency. Also to minimize light reflections from the faceplate 26 and to mask oil smudges from fingerprints and other dirt, a light roughening of the outer surface of the faceplate 26, e.g., to an 85% fine grit, is usable. The roughening may be effected by a light chemical etch, by particle blasting or by other methods. Where a cathode ray tube is used which has a color mask, roughening the surface of the faceplate 26 also disperses spatial frequency interference patterns created by the particular alignment of the two grids, i.e., the wire mesh and the CRT grid.

In FIG. 3 there is shown a partial cross sectional view of an electromagnetic energy interference sealing arrangement 30 in accordance with the invention. The seal 30 is located around the faceplate 26 and in contact with the bezel 14. The electromagnetic energy interference seal 30, like the bezel 14, is constructed of an electrically conductive material or may be constructed of a nonconductive material such as plastic which is coated with electrically conductive material. As shown in FIG. 3 and in the exploded cross-sectional view of FIG. 4, the faceplate 26 is stepped at its edges in this embodiment so that the embedded conductive wire mesh 38 can directly engage a matching stepped portion of the electromagnetic energy interference seal 30 which in turn engages the bezel 14 to form a complete electrically conductive path for electromagnetic energy interference sealing purposes. The stepped structure shown in FIGS. 3 and 4 is presented as an example of a technique for obtaining electrical contact between the various members.

In order to direct beams of light, one of which is indicated by the numeral 32 in FIG. 3, in front of and very close to the surface of the faceplate 26, waveguides 40 are formed in the electromagnetic energy interference seal 30 in line with each light beam path. As shown in FIG. 3, there is a waveguide 40 adjacent both the light beam source 34 and the detector 36.

The size of the waveguides 40 is selected so that they operate as waveguides above the cutoff frequency for the light beams traversing them and as waveguides below cutoff for lower frequency electromagnetic energy interference. With this size selection, the waveguides 40 permit passage of the light beams but block the passage of the lower frequency signals such as those developed by the circuitry inside the display unit. Where square wave signals are used in the internal display circuitry, harmonics of relatively high frequency may exist. For rejecting signals such as these, waveguides 40 having a cutoff frequency of about 100 GHz have been found to be effective. The cutoff frequency should be low enough so as to not attenuate the light beams 32 but high enough to reject the electromagnetic energy interference frequencies. For circular cross-section waveguide, a length to diameter ratio of four to one will normally result in a cutoff frequency within this range.

Another advantage of using the waveguides 40 is the resulting collimation of the light beams 32. In regard to the light beam detectors 36, the adjacent waveguides 40 shade them from extraneous light such as from overhead room lighting. This causes a signal to noise ratio improvement in the touch panel operation. This shading effect is particularly advantageous for detectors which are located adjacent the display screen edge. In these locations, light from the light beams or other sources tends to reflect off the raised surfaces surrounding the display such as the seal 30 and may strike the detectors thus biasing them and masking an interruption of the light beam itself. In a prior technique for solving this problem, an opaque structure termed a "reflection fence" was placed at the touch panel edge to obstruct reflections of the edge light beam from the touch panel edge structure. Without the reflection fence, it was found that interruption of these light beams was, in some cases, difficult since the detector was able to detect the reflection of the light beam as well as the beam itself and interrupting the beam was not possible. By placing the waveguide 40 adjacent the detector in accordance with the invention, edge reflections are not detected and the requirement for a "reflection fence" is eliminated.

In order to seal against electromagnetic energy interference, the waveguides 40 are made conductive. Additionally, to avoid reflections inside the waveguide 40, the surface may be darkened. However, in one embodiment, the inside surfaces of the waveguides 40 were not darkened and were reflective to light.

Figure 5:
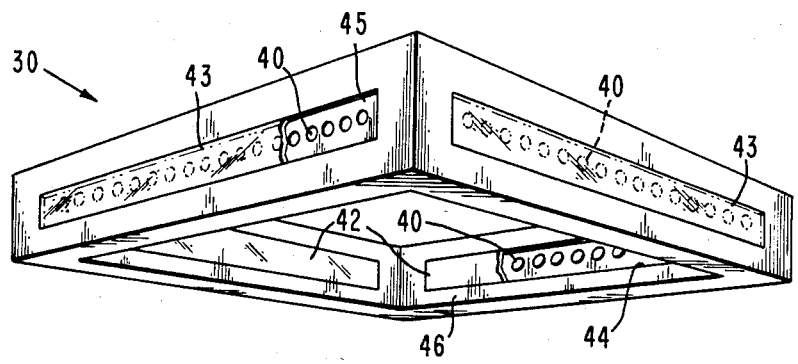
FIG. 5 is a perspective view of an electromagnetic energy interference seal in accordance with the invention, showing the light beam apertures functioning as waveguides through which the light beams pass.

An electromagnetic energy interference seal 30 in accordance with the invention is shown in FIG. 5. The seal 30 surrounds the periphery of the active area of the touch panel. As shown in FIG. 5, the electromagnetic energy interference seal 30 has a rectangular shape, however, this shape may correspond generally to the faceplate shape to define the active area of the touch panel. Also, other shapes may be used depending upon what shape is desired for the touch panel. For example, the touch panel size may exceed the size of the display screen 41 so that fixed function key areas may be included in the touch panel active area around the edges of the display screen 41 as shown in FIG. 1. In FIG. 1, the display screen 41 and fixed function key areas are shown in dashed lines.

The waveguides 40 are formed in the material of the electromagnetic energy interference seal 30 by means such as machining or casting and are aligned with waveguides 40 on the opposing wall to establish a path for the light beams. Where the electromagnetic energy interference seal 30 is constructed of a molded plastic material, coating it with first zinc, then aluminum, and then blackening the aluminum coating with a sulfide bath will result in electrically conductive, darkened surfaces.

In order to environmentally seal the waveguides and associated internal circuitry from environmental contaminants such as dust and liquids, a thin strip of material 42 and 43, which is transparent to the light beams, is mounted over the external and internal openings of the waveguides 40. These environmental seals 42 and 43 may take the form of transparent plastic or glass strips inserted in a groove machined into the electromagnetic energy interference seal 30 as shown in FIGS. 4 and 5 where strips 42 and 43 are seated into grooves 44 and 45, respectively. In FIG. 5, the environmental seal 42 is shown seated in the groove in member 46. It is preferable to use an environmental sealing strip which is transparent to the light beams and, in the case of the external strip 42, is darkened so that extraneous light is filtered out and a more aesthetically pleasing touch panel border is provided. When the strip is darkened, the waveguide 40 openings are not apparent to the display operator. The internal strip 43 may be clear. Where infrared light beams are used, a glass or Lexan strip which is tinted dark red has been found to be effective. The color chosen for the strip should not appreciably attenuate the light beams. Wavelengths in the red or dark green ranges have been found to be useful for the color of the external strip 42.

Sealing the openings of the waveguides 40 inside the display system 10 will prevent dust and other contaminants which may be circulating inside the display system from lodging in the waveguides 40 and degrading performance. As in sealing the outside openings of the waveguides 40, a plastic or glass strip 43 cemented into a machined groove 45 in the seal 30 has been found to be effective. An example of an internal environmental seal 43 is shown in the exploded view of FIG. 4. These strips may be held in place in the grooves by cementing or by other means.

As previously discussed, the length to diameter aspect ratio of the waveguide is such that it operates as a waveguide above cutoff for the frequency of the light beams. Also, the cross-section of the waveguides should be of a size large enough so that they do not alter the illumination of the associated light beam source 34. However, too large a cross-sectional size of the waveguide will cause an increase in the spacing of light beams from one another which will cause a decrease in resolution of the touch panel by limiting the number of beams. Also, increasing the cross-sectional size of the waveguide will cause a corresponding increase in the length of the waveguide to maintain the length to diameter aspect ratio required, and this will result in a larger electromagnetic energy interference seal 30 size and a larger display unit 10.

It has been found that spacing the centerlines of waveguides which are 3.1 mm in circular cross-section by 12.7 mm in length apart by approximately 3.3 mm will permit an interruption of at least three beams by the average size finger. A light beam matrix of 128 beams horizontally and 96 beams vertically will cover an interactive area of approximately 430 mm by 322 mm.

As shown in FIG. 4, the faceplate 26 and electromagnetic energy interference seal 30 have stepped edges to interlock with each other. The wire mesh 38 embedded in the faceplate 26 extends through the stepped edge area and is exposed. Thus, by assembling the two stepped edges together, the wire mesh, which provides an electrical path across the faceplate, is in contact with the electrically conductive electromagnetic energy interference seal 30 which is in electrical contact with the electrically conductive front bezel 14. By contacting the bezel 14 with the outer enclosure 12, the display apparatus is surrounded by electrically conductive material which may be connected to ground potential to provide a path for electromagnetic energy interference thereby shielding the display apparatus.

In order to facilitate maintainability and to establish an electrically conductive path for an electromagnetic energy interference sealing, a type of electrically conductive adhesive compound may be used in accordance with the invention at the interlocking stepped surfaces. By using a compound which provides adhesion but which permits nondestructive disassembly of the touch, panel, maintenance is facilitated while an electromagnetic energy interference seal can still be formed. When the compound is placed between the electromagnetic energy interference seal 30 and the faceplate 26 and wire mesh 38, the compound provides adhesion as well as a low electrical resistance across the joined parts to assure a continuous electrical contact all around the faceplate perimeter to preserve the electromagnetic energy interference seal. It has been found that a silver epoxy is usable for this purpose when not mixed with a catalyst. The silver epoxy is electrically conductive and preserves an electromagnetic energy interference seal since it has a putty-like viscosity which fills any surface irregularities. A supplier of such adhesive is Ablestick Corp. of Gardena, Calif.

Where the touch panel components are assembled as shown in FIG. 3, maintenance may be performed without requiring realignment each time the front bezel 14 is disassembled. Circuit cards 18 and 22 are shown mounted in place by standoffs 48 and 50 which are rigidly mounted to the front bezel 14. By also rigidly mounting the electromagnetic energy interference seal 30 to the front bezel 14 and using the mounting compound described above between the seal 30 and faceplate 26, disassembly can be effected for repair, such as to replace a broken faceplate 26, without loss of alignment of the light beam sources, detectors and the waveguides 40.

The foregoing detailed description and the accompanying drawings have presented certain embodiments of the invention. Variations and modifications of the specific constructions shown may be employed without departing from the scope of the invention. For example, circular waveguides have been discussed but waveguides of other cross-section shapes are usable. The display device has been referred to as a video display tube and a CRT, however, other display devices including flat panel displays such as a plasma display are usable. Also, light emitting diodes of infrared light have been described as the optical sources, however, other types of light sources are also usable. In addition, instead of using a separate sealing arrangement between the faceplate and the outer bezel, the faceplate could be formed of a single sheet of conductive material or coated plastic, bent or dished at the edges to directly engage the outer bezel. Waveguides would be formed in the outer stepped or beveled edge of the conductive material or coated plastic sheet. Alternatively, a single bezel member may extend all the way from the faceplate to engage the outer enclosure 10. Accordingly, it is intended that the scope of the invention include such variations and modifications as well as others unless limited by the claims.

What is claimed is:

1. An electromagnetic energy interference seal for light beam touch panel systems having a matrix of crossed light beams formed by pairs of opposing light beam sources and light beam detectors used to establish the position of an object inserted into said matrix, said matrix having a periphery comprising:
    an electrically conductive member disposed at the periphery of the matrix of crossed light beams and having a plurality of spaced apart apertures formed therethrough which are disposed in optical alignment with the light beams for passing the light beams therethrough;
    the apertures having a cross-section size to length ratio selected so that said apertures act as waveguides having a cutoff frequency which is lower than the frequency of the passing light beams and is higher than the frequency of electromagnetic energy interference; and
    environmental sealing means disposed across the apertures for sealing said apertures from environmental contaminants.

2. The electromagnetic energy interference seal of claim 1 wherein the plurality of apertures are disposed in the member such that there are two apertures in optical alignment with each light beam, one aperture being disposed adjacent a light beam source and the second aperture being disposed adjacent the paired light beam detector.

3. The electromagnetic energy interference seal of claim 1 wherein the length of the apertures is at least four times the cross-sectional size.

4. The electromagnetic energy interference seal of claim 1 wherein the length of the apertures is approximately four times the cross-sectional size.

5. The electromagnetic energy interference seal of claim 1 wherein the apertures have a circular cross-sectional shape and the length of the apertures is at least four times their diameter.

6. The electromagnetic energy interference seal of claim 1 wherein the apertures have a circular cross-sectional shape and the length of the apertures is approximately four times their diameter.

7. The electromagnetic energy interference seal of claim 1 wherein the apertures have a cutoff frequency of approximately 100 GHz.

8. The electromagnetic energy interference seal of claim 1 wherein the apertures each have an inner surface and the inner surface of each aperture is nonreflective.

9. The electromagnetic energy interference seal of claim 1 wherein the environmental sealing means comprises a cover which substantially passes the light beam without attenuation.

10. The electromagnetic energy interference seal of claim 9 wherein the cover has a dark color.

11. The electromagnetic energy interference seal of claim 9 wherein the environmental sealing means comprises a cover over the external openings of the waveguides which is of a dark color and a cover over the internal openings of the waveguides which is substantially clear, both covers substantially passing the light beams without attenuation.

12. The electromagnetic energy interference seal of claim 1 wherein the member is held in place in relation to the touch panel system by means of an electrically conductive compound having a relatively low coefficient of adhesion which permits nondestructive disassembly of the member.

13. The electromagnetic energy interference seal of claim 12 wherein the compound comprises a silver epoxy applied without use of a catalyst.

14. An electromagnetic energy interference seal for light beam touch panel systems having a matrix of crossed light beams formed by pairs of opposing light beam sources and light beam detectors used to establish the position of an object inserted into that matrix, said matrix having a periphery comprising:
an electrically conductive member disposed at the periphery of the matrix of crossed light beams and having a plurality of spaced apart apertures formed therethrough;
the plurality of apertures being disposed in the member such that there are two apertures in optical alignment with each light beam, one aperture being disposed adjacent a light beam source and the second aperture being disposed adjacent the paired light beam detector;
the apertures having a cross-sectional size to length ratio selected so that they act as waveguides having a cutoff frequency which is lower than the frequency of the passing light beams and is higher than the frequency of electromagnetic energy interference; and
environmental sealing means disposed across the apertures for sealing the apertures from environmental contaminants.

15. The electromagnetic energy interference seal of claim 14 wherein the length of the apertures is at least four times the cross-sectional size.

16. The electromagnetic energy interference seal of claim 14 wherein the length of the apertures is approximately four times the cross-sectional size.

17. The electromagnetic energy interference seal of claim 14 wherein the apertures have a circular cross-sectional shape and the length of the apertures is at least four times their diameter.

18. The electromagnetic energy interference seal of claim 14 wherein the apertures have a circular cross-sectional shape and the length of the apertures is approximately four times their diameter.

19. The electromagnetic energy interference seal of claim 14 wherein the apertures have a cutoff frequency of approximately 100 GHz.

20. The electromagnetic energy interference seal of claim 14 wherein the apertures each have an inner surface and the inner surface of each aperture is nonreflective.

21. The electromagnetic energy interference seal of claim 14 wherein the enviromnental sealing means comprises a cover which substantially passes the light beam without attenuation.

22. The electromagnetic energy in interference seal of claim 21 wherein the cover has a dark color.

23. The electromagnetic energy interference seal of claim 21 wherein the environmental sealing means comprises a cover over the external openings of the waveguides which is of a dark color and a cover over the internal openings of the waveguides which is substantially clear, both covers substantially passing the light beams without attenuation.

24. The electromagnetic energy interference seal of claim 14 wherein the member is held in place in relation to the touch panel system by means of an electrically conductive compound having a relatively low coefficient of adhesion which permits nondestructive disassembly of the member.

25. The electromagnetic energy interference seal of claim 24 wherein the compound comprises a silver epoxy applied without use of a catalyst.

26. An electromagnetic energy interference seal for light beam touch panel systems having a matrix of crossed light beams formed by pairs of opposing light beam sources and light beam detectors used to establish the position of an object inserted into said matrix, said matrix having a periphery comprising:
an electrically conductive member disposed at the periphery of the matrix of crossed light beams and having a plurality of spaced apart apertures formed therethrough;
the plurality of apertures being disposed in the member such that there are two apertures in optical alignment with each light beam, one aperture being disposed adjacent a light beam source and the second aperture being disposed adjacent the paired light beam detector;
the apertures having a circular cross-section and having a length which is approximately four times their diameter whereby the apertures act as waveguides having a cutoff frequency below the frequency of the light beams but above the frequency of electromagnetic energy interference;
a first cover of a dark color which is disposed over the external openings of the apertures to seal the apertures from environmental contaminants while substantially passing the light beams without attenuation; and
a second cover which is disposed over the internal openings of the apertures to seal the apertures from environmental contaminants while substantially passing the light beams without attenuation.

27. The electromagnetic energy interference seal of claim 26 wherein the apertures each have an inner surface and the inner surface of each aperture is nonreflective.

28. The electromagnetic energy interference seal of claim 26 wherein the member is held in place in relation to the touch panel system by means of an electrically conductive compound having a relatively low coefficient of adhesion which permits nondestructive disassembly of the member from the touch panel.

29. The electromagnetic energy interference seal of claim 28 wherein the compound comprises a silver epoxy applied without use of a catalyst.

30. Electromagnetic energy interference sealing apparatus for a light beam touch panel system having a matrix of crossed light beams formed in front of the face of a display device by pairs of opposing light beam sources and light beam detectors used to establish the position of an object inserted into said matrix, the sorces and detectors being arrayed around the periphery of the display device, the sealing apparatus being used for sealing of the system including the display device, sources and detectors, the sealing apparatus comprising:

an electromagnetic interference sealing means including an embedded conductive mesh across the face of said display device;

means including a bezel enclosing said display device;

an electrically conductive strip disposed about said periphery between said bezel and said sealing means and having a plurality of spaced apart aperture means formed therethrough which are disposed in optical alignment with the light beams for passing the light beams therethrough;

the aperture means each having a cross-section size-to-length ratio selected so that each said aperture means acts as a waveguide having a cutoff frequency which is lower than the frequency of the passing light beams and is higher than the frequency of electromagnetic energy interference;

means for electrically connecting said wire mesh to said conductive strip; and environmental sealing means disposed across each said aperture means for sealing each said aperture means for environmental contaminants.

* * * * *